(12) United States Patent
Xu et al.

(10) Patent No.: US 12,629,656 B2
(45) Date of Patent: May 19, 2026

(54) SUPERFICIALLY POROUS ORGANIC POLYMER PARTICLES

(71) Applicant: Waters Technologies Corporation, Milford, MA (US)

(72) Inventors: MingCheng Xu, Lexington, MA (US); Darryl W. Brousmiche, Grafton, MA (US); Kevin Wyndham, Upton, MA (US); Daniel P. Walsh, Danvers, MA (US); Nicole L Lawrence, Stafford Springs, CT (US)

(73) Assignee: Waters Technologies Corporation, Milford, MA (US)

( * ) Notice: Subject to any disclaimer, the term of this patent is extended or adjusted under 35 U.S.C. 154(b) by 762 days.

(21) Appl. No.: 17/896,324

(22) Filed: Aug. 26, 2022

(65) Prior Publication Data

US 2023/0073279 A1     Mar. 9, 2023

Related U.S. Application Data

(60) Provisional application No. 63/237,169, filed on Aug. 26, 2021.

(51) Int. Cl.
| | |
|---|---|
| B01J 20/26 | (2006.01) |
| B01J 20/28 | (2006.01) |
| B01J 20/285 | (2006.01) |

(52) U.S. Cl.
CPC ....... B01J 20/261 (2013.01); B01J 20/28004 (2013.01); B01J 20/28021 (2013.01); (Continued)

(58) Field of Classification Search
CPC ................ B01J 20/261; B01J 20/28004; B01J 20/28021; B01J 20/28083; B01J 20/28085; (Continued)

(56) References Cited

U.S. PATENT DOCUMENTS

2016/0184736 A1* 6/2016 Wyndham .............. B01D 15/08
                                                        210/198.2
2019/0322783 A1* 10/2019 Brousmiche ........... B01J 20/286

OTHER PUBLICATIONS

Fekete et al. "Fast liquid chromatography: The domination of core-shell and very fine particles." J. Chromatogr. A. 1228(2012): 57-71.

(Continued)

*Primary Examiner* — Michael Forrest
*Assistant Examiner* — Nicole Lee Quest
(74) *Attorney, Agent, or Firm* — WOMBLE BOND DICKINSON (US) LLP; Deborah M. Vernon

(57) ABSTRACT
In various embodiments, the present disclosure pertains to organic polymer core-shell particles that comprise a non-porous organic polymer core (i.e., having a pore volume of less than 0.1 cc/g) and a porous organic polymer shell (i.e., having a pore volume of greater than 0.1 cc/g), in which the porous organic polymer shell has a pore size ranging from 100 Å to 3000 Å. In some embodiments, the present disclosure pertains to chromatographic separation devices that comprise such organic polymer core-shell particles. In some embodiments, the present disclosure pertains to chromatographic methods that comprise: (a) loading a sample onto a chromatographic column comprising such organic polymer core-shell particles and (b) flowing a mobile phase through the column.

19 Claims, 5 Drawing Sheets

Porous Shell
Confined in the
Shell Template

Remove Shell Template

Shell

Diameter

Superficially
Porous Particle

(52) U.S. Cl.

CPC ... *B01J 20/28083* (2013.01); *B01J 20/28085*
(2013.01); *B01J 20/285* (2013.01); *B01J*
*2220/445* (2013.01)

(58) Field of Classification Search

CPC ................ B01J 20/285; B01J 2220/445; B01J
20/28071; B01J 20/28076; B01J
20/28078; B01J 20/321; B01J 20/3212;
B01J 20/327; B01J 20/3272; B01J
20/3276; B01J 20/3293

See application file for complete search history.

(56) References Cited

OTHER PUBLICATIONS

International Search Report and Written Opinion issued in International Application No. PCT/IB2022/058018 dated Dec. 7, 2022.

Li et al. "Monodisperse Cross-Linked Core-Shell Polymer Microspheres by Precipitation Polymerization." Macromol. 33(2000): 4354-4360.

Li et al. "Precipitation polymerizatin for fabrication of complex core-shell hybrid particles and hollow structures." Chem. Soc. Rev. 42(2013): 3628.

Qi et al. "Synthesis of core-shell polymer microspheres by two-stage distillation-precipitation polymerization." Eur. Poly. J. 41(2005): 2320-2328.

* cited by examiner

Monomer: Styrene / DVB80
Stabilizer: PVP-40
Initiator: AIBN
Solvent: Reagent Alcohol
　　　　　 p-Xylene 70°c
———————————→
18-24 hours

○

Crosslinker: DVB80 W/O Styrene
Solvent: Reagent Alcohol
Stabilizer: PVP-40

70°c

Particle Growth to Target Size    NP Core Particle

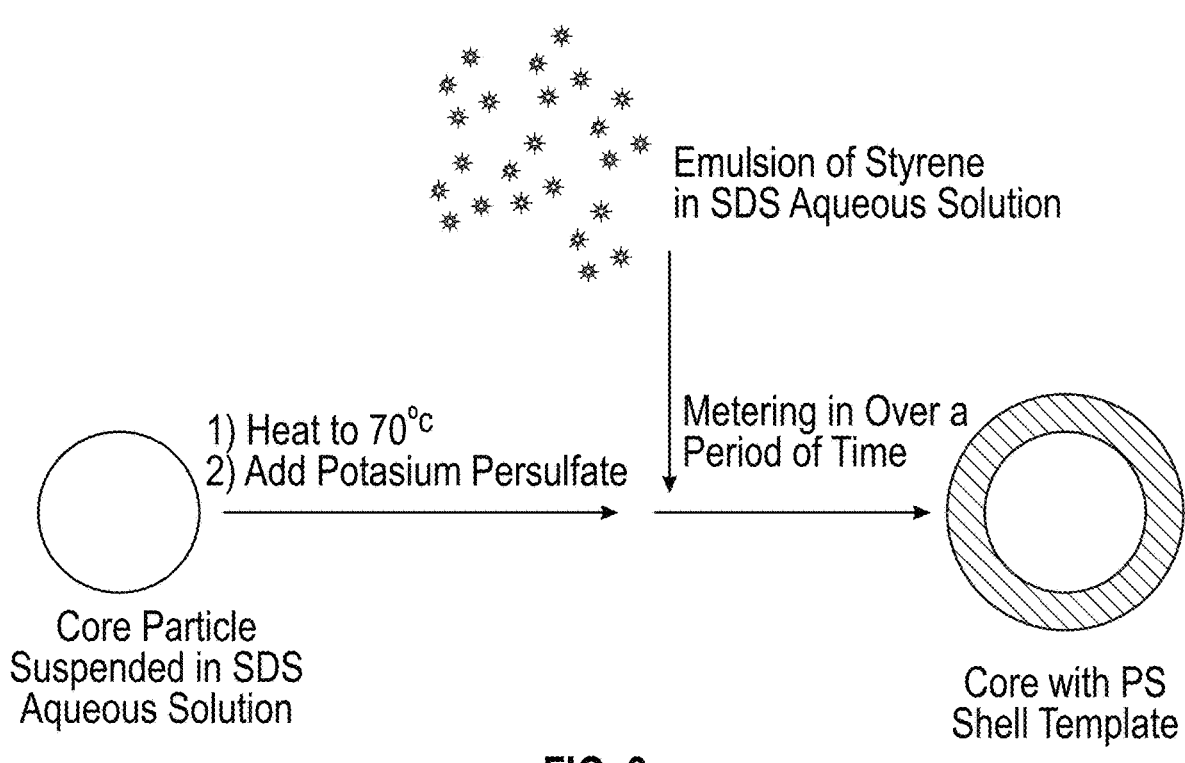

Emulsion of Styrene
in SDS Aqueous Solution

1) Heat to 70°c
2) Add Potasium Persulfate

Metering in Over a
Period of Time

Core Particle
Suspended in SDS
Aqueous Solution

Core with PS
Shell Template

FIG. 3

Monomer (Styrene, MA, MMA, etc)
Crosslinker (DVB, EDMA, etc)
Initiator (VAZO, BPO, etc)
Porogen
Emulsion in Surfactant Aqueous Solution Swell the Polymer Shell Template NP Core
with NP
Polymer Shell Core-Shell Seeds
with Swollen Shell

FIG. 4

1) Add PVA Solution
2) Polymerization

Core-Shell Seeds
with Swollen Shell

Porous Shell Confined in the
Polymer Shell Template

Remove Shell Template

Diameter

Shell

Porous Shell
Confined in the
Shell Template

Superficially
Porous Particle

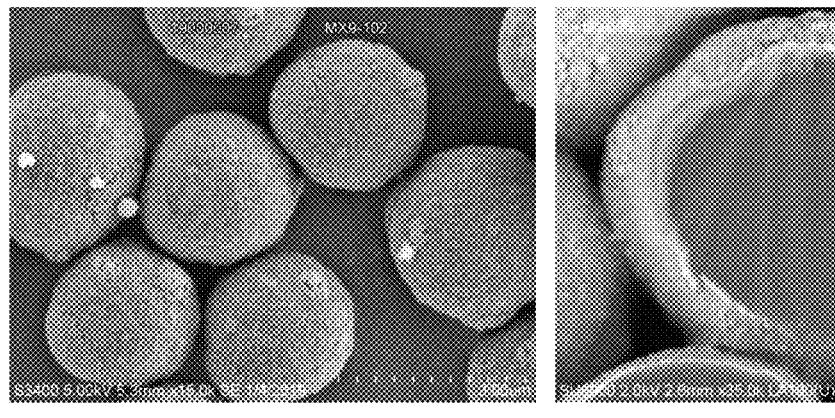
Fig. 7A                                    Fig. 7B
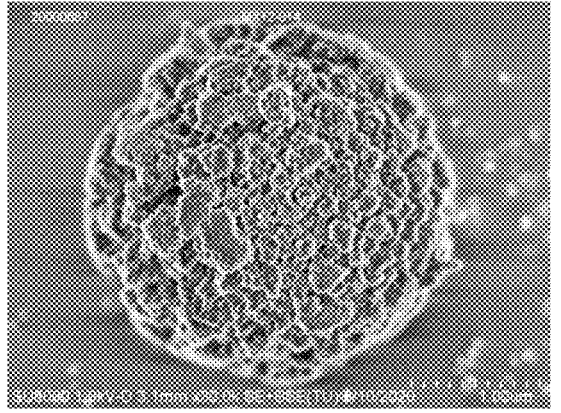
Fig. 8A                                    Fig. 8B
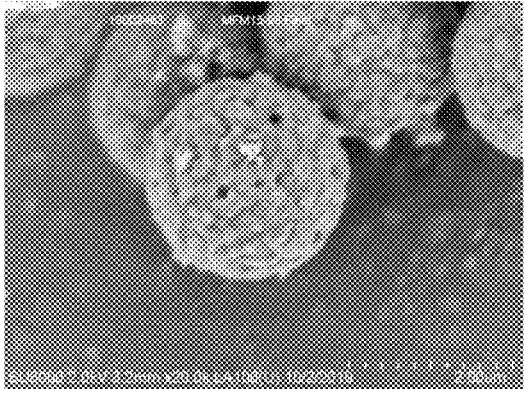
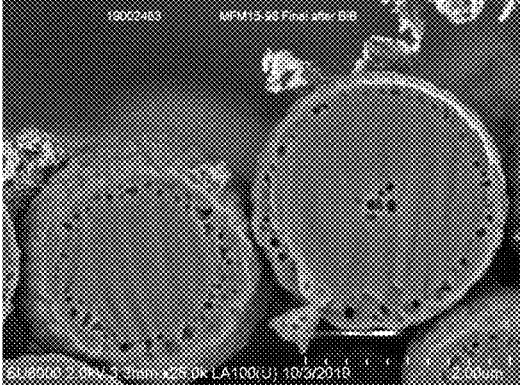
Fig. 9A                                    Fig. 9B

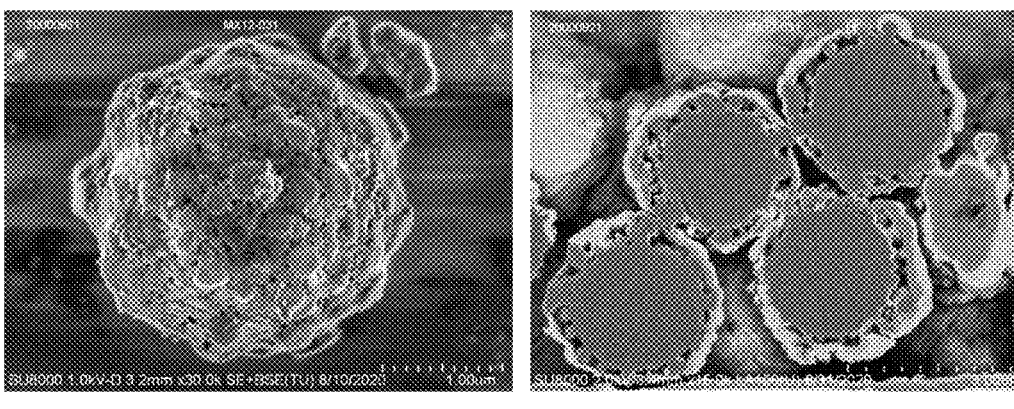
Fig. 10A                              Fig. 10B
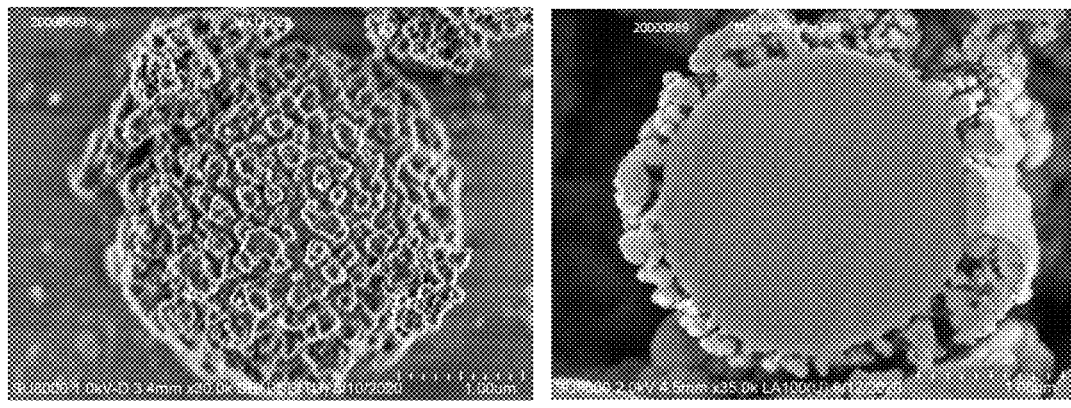
Fig. 11A                              Fig. 11B
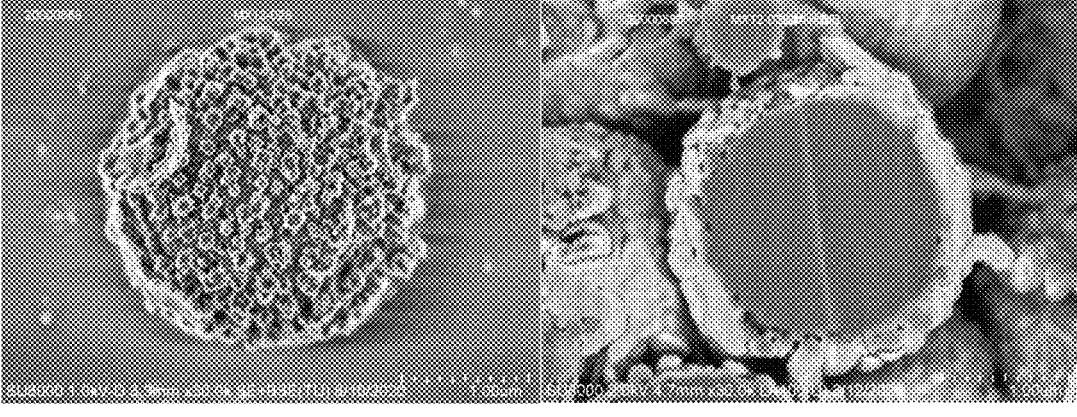
Fig. 12A                              Fig. 12B

SUPERFICIALLY POROUS ORGANIC POLYMER PARTICLES

CROSS-REFERENCE TO RELATED APPLICATION

This application claims priority and benefit to U.S. Provisional Patent Application No. 63/237,169, filed on Aug. 26, 2021, and entitled "SUPERFICIALLY POROUS ORGANIC POLYMER PARTICLES", the contents of which is incorporated herein by reference in its entirety.

BACKGROUND

Superficially porous particles (also called pellicular, fused-core, or core-shell particles) comprise a core-shell structure based on a non-porous core and a porous shell. Such particles were routinely used as chromatographic sorbents in the 1970's. These earlier superficially porous materials had thin porous layers, prepared from the adsorption of silica sols to the surface of ill-defined, polydisperse, non-porous silica cores (>20 μm). Modern, commercially available superficially porous materials typically use smaller (e.g., <2 μm) particles. Superficially porous particles have various advantages over fully porous particles, including improvements in mass transfer, increased efficiencies, and reduced back pressures.

Currently, the dominant superficially porous chromatographic materials comprise a core-shell structure based on a non-porous core and a porous shell and are made from silica or organic/inorganic hybrid materials. The hybrid materials have shown significant improvement in broader pH stability relative to silica materials. However, further improvements in pH stability are desired, particularly where in chromatographic applications where a high concentration of base or acid is needed, such as bio-separations. Moreover, current superficially porous chromatographic materials are available in a limited range of pore sizes.

There is a continuing need for further superficially porous chromatographic particles, which have a narrow particle size distribution, improved chemical stability with high and low pH mobile phases, and broad flexibility with regards to pore diameter selection in the shell material.

SUMMARY

In various embodiments, the present disclosure pertains to organic polymer core-shell particles that comprise a non-porous organic polymer core and a porous organic polymer shell, in which the porous organic polymer shell has a pore size ranging from 60 Å to 3000 Å.

In some embodiments, the organic polymer core-shell particles have a particle size ranging from 1 μm to 14 μm. That is, the diameter of the entire organic polymer core-shell particle (i.e., diameter through the center of the core and extending through to an outer/exterior edge of the shell) ranges from 1 μm to 14 μm.

In some embodiments, which pertain to the any of the above embodiments, the organic polymer core comprises an organic polymer having a polymer backbone that contains C—C covalent bonds. C—O covalent bonds, C—N covalent bonds. O—N covalent bonds, or a combination thereof.

In some embodiments, which pertain to the any of the above embodiments, the organic polymer core comprises an organic polymer having a polymer backbone that contains C—C covalent bonds.

In some embodiments, which pertain to the any of the above embodiments, the organic polymer core comprises an organic polymer that is formed from radical polymerization or condensation polymerization.

In some embodiments, which pertain to the any of the above embodiments, the organic polymer core comprises an organic polymer that comprises hydrophobic organic monomer residues, hydrophilic organic monomer residues, or a mixture of hydrophilic organic monomer residues and hydrophobic organic monomer residues.

In some embodiments, which pertain to the any of the above embodiments, the organic polymer core comprises polyfunctional monomer residues.

In some embodiments, which pertain to the any of the above embodiments, the organic polymer core comprises polyfunctional monomer residues and monofunctional monomer residues. In some of these embodiments, the organic polymer core comprises a central core region and an outer core region surrounding the central core region, and a concentration of the monofunctional monomer residues is greater in the central core region than in the outer core region.

In some embodiments, which pertain to the any of the above embodiments, the organic polymer core comprises divinyl benzene residues, styrene residues. (meth)acrylate residues, and combinations thereof.

In some embodiments, which pertain to the any of the above embodiments, the porous organic polymer shell ranges from 0.1 to 4 microns in thickness.

In some embodiments, which pertain to the any of the above embodiments, a ratio of a diameter of the non-porous core to an overall diameter of the organic polymer core-shell particle is in the range from 0.4/1 to 0.99/1.

In some embodiments, which pertain to the any of the above embodiments, the organic polymer shell comprises an organic polymer having a polymer backbone that contains C—C covalent bonds. C—O covalent bonds, C—N covalent bonds, O—N covalent bonds, or a combination thereof.

In some embodiments, while the organic polymer core and the organic polymer shell can be formed of substantially chemically similar material, the organic polymer core regions and the organic polymer shell regions are distinct in terms of morphology. For example, the core region is non porous (i.e., having less than 0.1 cc/g pore volume (e.g., 0.02 cc/g), whereas the shell region is porous (i.e., having more than 0.1 cc/g pore volume (e.g., 0.25 cc/g))

In some embodiments, which pertain to the any of the above embodiments, the organic polymer shell comprises an organic polymer that is formed from radical polymerization or condensation polymerization.

In some embodiments, which pertain to the any of the above embodiments, the organic polymer shell comprises an organic polymer that comprises hydrophobic organic monomer residues, hydrophilic organic monomer residues, or a mixture of hydrophilic organic monomer residues and hydrophobic organic monomer residues In some embodiments, which pertain to the any of the above embodiments, the organic polymer shell comprises polyfunctional monomer residues.

In some embodiments, which pertain to the any of the above embodiments, the polyfunctional monomer residues are selected from divinylbenzene residues, ethylene glycol di(meth)acrylate residues, di(meth)acrylate residues, and combinations thereof.

In some embodiments, which pertain to the any of the above embodiments, the organic polymer shell further comprises monofunctional monomer residues. In some of these embodiments, the mnonofunctional monomer residues are selected from styrene residues, vinyl benzyl chloride residues, glycidyl methacrylate residues. (meth)acrylamide residues, and combinations thereof.

In some embodiments, the present disclosure pertains to chromatographic separation devices that comprise the organic polymer core-shell particles of any of the above embodiments.

In some embodiments, the chromatographic separation device is a column.

In some embodiments, the present disclosure pertains to chromatographic methods that comprise: (a) loading a sample onto a chromatographic column comprising the organic polymer core-shell particles of any of the above embodiments and (b) flowing a mobile phase through the column.

BRIEF DESCRIPTION OF THE DRAWINGS

FIG. 3 is a schematic diagram illustrating the formation of a polystyrene template of a nonporous organic polymer core, in accordance with an embodiment of the present disclosure.

FIG. 4 is a schematic diagram illustrating the swelling of a polystyrene template with various radical polymerizable monomers, in accordance with an embodiment of the present disclosure.

FIG. 7A is an electron micrograph of whole particles, in accordance with Example 7.

FIG. 7B is a cross-sectional view of the whole particles shown in FIG. 7A, in accordance with various embodiments of the present disclosure.

FIG. 8A is electron micrograph of whole particles, in accordance with Example 8.

FIG. 8B is a cross-sectional view of the whole particles shown in FIG. 8A, in accordance with various embodiments of the present disclosure.

FIG. 9A is electron micrograph of whole particles, in accordance with Example 9.

FIG. 9B is a cross-sectional view of the whole particles shown in FIG. 9A, in accordance with various embodiments of the present disclosure.

FIG. 10A is electron micrograph of whole particles, in accordance with Example 10.

FIG. 10B is a cross-sectional view of the whole particles shown in FIG. 10A, in accordance with various embodiments of the present disclosure.

FIG. 11A is electron micrograph of whole particles, in accordance with various embodiments of the present disclosure.

FIG. 11B is a cross-sectional view of the whole particles shown in FIG. 11A, in accordance with various embodiments of the present disclosure.

FIG. 12A is electron micrograph of whole particles, in accordance with various embodiments of the present disclosure.

FIG. 12B is a cross-sectional view of the whole particles shown in FIG. 12A, in accordance with various embodiments of the present disclosure.

DETAILED DESCRIPTION

Figures 1, 2:
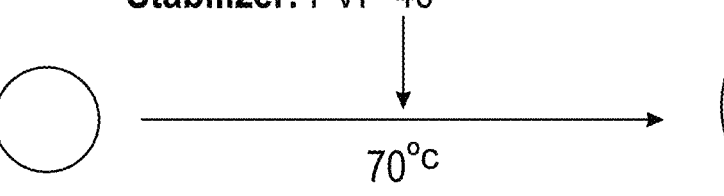
FIG. 1 is a schematic illustration of a nonporous organic polymer core formation step, in accordance with an embodiment of the present disclosure.
FIG. 2 is a schematic illustration of a nonporous organic polymer core growth step, in accordance with an embodiment of the present disclosure.

The present disclosure pertains to superficially porous organic polymer particles (also referred to herein as core-shell particles) that comprise a non-porous organic polymer core and a porous organic polymer shell disposed around the non-porous organic polymer core. The core-shell particles of the present disclosure typically contain more than 95% organic polymer, more typically more than 97.5% organic polymer, even more typically more than 99% organic polymer.

The core-shell particles of the present disclosure are typically spherical. The core-shell particles of the present disclosure typically range from 1 to 14 microns in diameter, more typically, from 1 to 5 microns in diameter. Particle diameter is measured herein by Coulter counter ((Beckman Coulter, Multisizer 4e Coulter Counter, Brea, CA, USA) by dispersing the sample in methanol containing 5% lithium chloride. A greater than 70,000 particle count is run using a 30 $\mu$m aperture in the volume mode for each sample. Using the Coulter principle, volumes of particles are converted to diameter, where a particle diameter is the equivalent spherical diameter, which is the diameter of a sphere whose volume is identical to that of the particle. Particle diameter measured as the 50% cumulative diameter of the volume-based particle size distribution The core-shell particles of the present disclosure have good stability, even at pH's greater than 12 and less than 1, in some embodiments.

The core-shell particles of the present disclosure feature shell regions having typically narrowly dispersed in particle size. As defined herein, a collection of particles is "narrowly dispersed in particle size" when a ratio of 90% cumulative volume diameter divided by the 10% cumulative volume diameter is less than 1.4 when measured by Beckman Coulter, Multisizer 4e Coulter Counter.

The core-shell particles of the present disclosure can be of widely ranging porosity. For example, the core-shell particles may have average pore diameters that range from 50 to 3000 Angstroms, for example ranging from 50 to 100 to 150 to 200 250 to 500 to 750 to 1000 to 1500 to 2000 to 2500 to 3000 Angstroms. As seen from the Examples below, the present disclosure enables the production of core-shell particles having very large average pore diameters of ~1500 Angstroms. Pore sizes are measured by conventional porosimetry methods. For sub-500 Angstrom pores, the average pore diameter (APD) can be measured using the multipoint $N_2$ sorption method (Micromeritics ASAP 2400; Micromeritics Instruments Inc., Norcross, GA), with APD being calculated from the desorption leg of the isotherm using the BJH method as is known in the art. Hg porosimetry may be used for pores that are 400 Angstrom or greater, as is known in the art.

The nonporous organic polymer core and porous organic polymer shell will now be discussed in more detail.
Nonporous Organic Polymer Core The organic polymer cores for use in the present disclosure comprise at least one organic polymer. The organic polymer cores typically contain more than 95% organic polymer, more typically more than 97.5% organic polymer, even more typically more than 99% organic polymer.

The organic polymer cores are nonporous, which is defined herein to mean that the organic polymer cores have a pore volume that is less than 0.1 cc/g. Preferably, organic polymer cores have a pore volume that is less than 0.02 cc/g, in some embodiments. Pore volume is determined using methods known in the art based on multipoint nitrogen sorption experiments (Micromeritics ASAP 2400; Micromeritics Instruments Inc., Norcross, GA).

The organic polymer cores typically range, for example, from 1 to 10 microns in diameter, more typically, from 1 to 5 microns in diameter. The organic polymer cores are typically narrowly distributed in particle size.

Elementally, organic polymer cores for use in the present disclosure include those that are composed of carbon and hydrogen, those composed of carbon, hydrogen and oxygen, those composed of carbon, hydrogen and nitrogen, and those composed of carbon, hydrogen, nitrogen and oxygen. The backbones of the organic polymer chains forming the organic polymer cores may contain C—C, C—O, C—N and/or O—N covalent bonds. In some embodiments (e.g., in the case of an organic polymer formed by radical polymerization of vinyl groups), the backbone of the at least one organic polymer chains may contain only C—C covalent bonds.

As noted above organic polymer cores for use in the present disclosure comprise at least one organic polymer. The at least one organic polymer comprises residues of one or more organic monomers. The one or more organic monomers residues forming the least one organic polymer may be selected from residues of hydrophobic organic monomers, residues of hydrophilic organic monomers, or a mixture of residues of hydrophobic organic monomers and residues of hydrophilic organic monomers.

Hydrophobic organic monomers may be selected, for example, from a $C_2$-$C_{18}$ olefin monomer and/or a monomer comprising a $C_6$-$C_{18}$ monocyclic or multicyclic carbocyclic group (e.g., a phenyl group, a phenylene group, naphthalene group, etc.). Specific examples of hydrophobic organic monomers include, for example, monofunctional and multifunctional aromatic monomers such as styrene, alkyl substituted styrene, halo substituted styrene, divinylbenzene, and vinylbenzyl chloride, monofunctional and multifunctional olefin monomers such as ethylene, propylene or butylene, monofunctional and multifunctional fluorinated monomers such as fluoroethylene, 1,1-(difluoroethylene), tetrafluoroethylene, chlorotrifluoroethylene, hexafluoropropylene, perfluoropropylvinylether, or perfluoromethylvinylether, monofunctional or multifunctional acrylate monomers having a higher alkyl or carbocyclic groups, for example, monofunctional or multifunctional acrylate monomers having a $C_6$-$C_{18}$ alkyl, alkenyl or alkynyl group or a $C_6$-$C_{18}$ saturated, unsaturated or aromatic carbocyclic group, monofunctional or multifunctional methacrylate monomers having a higher alkyl or carbocyclic group, for example, monofunctional or multifunctional methacrylate monomers having a $C_6$-$C_{18}$ alkyl, alkenyl or alkynyl group or a $C_6$-$C_{18}$ saturated, unsaturated or aromatic carbocyclic group, among others.

Hydrophilic organic monomers may be selected, for example, from monofunctional or multifunctional organic monomers having an amide group, monofunctional or multifunctional organic monomers having an ester group, monofunctional or multifunctional organic monomers having a carbonate group, monofunctional or multifunctional organic monomers having a carbamate group, monofunctional or multifunctional organic monomers having a urea group, monofunctional or multifunctional organic monomers having a hydroxyl group, and monofunctional or multifunctional organic monomers having a nitrogen-containing heterocyclic group, among other possibilities. Specific examples of hydrophilic organic monomers include, for example, vinyl pyridine, N-vinylpyrrolidone, N-vinyl-piperidone, N-vinyl caprolactam, lower alkyl acrylates (e.g., methyl acrylate, ethyl acrylate, etc.), lower alkyl methacrylates (e.g., methyl methacrylate, ethyl methacrylate, etc.), vinyl acetate, acrylamide or methacrylamide monomers, hydroxypolyethoxy allyl ether monomers, ethoxy ethyl methacrylate, glycidyl methacrylate, ethylene glycol dimethacrylate, methylene bisacrylamide, allyl methacrylate, or diallyl maleate.

In various embodiments, the organic polymer comprises residues of multifunctional hydrophobic organic monomers such as divinylbenzene and/or multifunctional hydrophilic organic monomers, such as ethylene glycol dimethacrylate, methylene bisacrylamide or allyl methacrylate, in order to provide crosslinks in the organic copolymer. In certain embodiments, DVB 80 may be employed, which is an organic monomer mixture that comprises divinylbenzene (80%) as well as a mixture of ethyl-styrene isomers, diethylbenzene, and can include other isomers as well.

In various embodiments, the organic polymer may comprise residues of only multifunctional organic monomers. In various embodiments, the organic polymer may comprise residues of both multifunctional organic monomers and monofunctional organic monomers.

The present inventors have found that, in some embodiments, the porosity of a material formed from an organic polymer containing multifunctional organic monomer residues can be reduced by adding monofunctional organic monomer residues to the organic polymer, or that the porosity of a material formed from an organic polymer containing multifunctional organic monomer residues and monofunctional organic monomer residues can be reduced by increasing an amount of the monofunctional organic monomer residues relative to the multifunctional organic monomer residues in the organic polymer. For example, it has been found that organic polymer cores formed from DVDB 80 (which are formed from organic polymers containing 80% multifunctional divinyl benzene monomer residues and monofunctional ethylstyrene monomer residues as explained above) have a porosity of about 0.015 cc/g, whereas organic polymer cores formed from DVDB 80 and styrene (which contain multifunctional divinyl benzene monomer residues, monofunctional ethylstyrene monomer residues, and additional monofunctional styrene monomer residues) have a porosity of less than 0.007 cc/g.

In some embodiments, organic polymer cores are created in which a central region of the cores is formed from an organic copolymer containing multifunctional organic monomer residues and monofunctional organic monomer residues and an outer region of the cores is formed from an organic homopolymer containing only multifunctional organic monomer residues. In some embodiments, organic polymer cores are created in which a central region of the cores is formed from an organic copolymer containing multifunctional organic monomer residues and monofunctional organic monomer residues and an outer region of the cores is also formed from an organic copolymer containing multifunctional organic monomer residues and monofunctional organic monomer residues, but wherein a molar ratio of the multifunctional organic monomer residues relative to the monofunctional organic monomer residues is increased in the outer core region relative to the central core region. In a particular example, organic polymer cores are created in which a central region of the cores is formed from DVB and styrene and an outer region of the cores is formed from DVB.

In various embodiments, an entire organic polymer core may be formed from an organic polymer that comprises residues of multifunctional organic monomers but does not contain resides of monofunctional organic monomers. In various embodiments, an entire organic polymer core may be formed from an organic polymer that comprises residues of both multifunctional organic monomers and monofunctional organic monomers.

The organic polymers forming the organic polymer cores can be prepared via a number of processes and mechanisms including, but not limited to, chain addition and step condensation processes, radical, anionic, cationic, ring-opening, group transfer, metathesis, and photochemical mechanisms. In particularly beneficial embodiments, the porous organic polymer cores are prepared via free radical polymerization.

The organic polymer cores of the present disclosure can be prepared in some embodiments by a dispersion polymerization process in which a homogeneous solution is formed, wherein monomers, initiator and stabilizer are combined in a solvent or solvent mixture. As polymerization proceeds, the initially formed polymers precipitate from the homogeneous solution to form nuclei. The nuclei that form still bear reactive sites such as radicals which allow them to keep growing by continuous capture and incorporation of monomers and/or oligomers from the solution.

In an exemplary process based on radical polymerization, one or more solvents and one or more stabilizers are purged with nitrogen to remove dissolved oxygen. Then, one or more monomers, including at least one multifunctional monomer, and a radical polymerization initiator are added. Radical polymerization is initiated by raising the temperature for several hours, typically under agitation. Based on the desired particle diameter, further radical polymerization initiator and further monomer may be added to the reaction mixture to allow the particle to grow further to the desired size. After reaction, the particles may be thoroughly washed and dried under vacuum.

Any radical initiator that is compatible with the organic phase may be used, either alone or in a mixture of such radical initiators. In particular embodiments, the radical initiators are capable of being heat activated or photoactivated. In specific embodiments, the radical initiator is a peroxide, a peroxyacetate, a persulfate, an azo initiator or a mixture thereof.

Where the initiator is a thermal initiator, the resulting solution may then be heated to an elevated temperature under agitation to activate the thermal initiator(s) and maintained at elevated temperature until polymerization is complete. Where the initiator is a photoinitiator, the resulting solution may then be illuminated under agitation with light having a suitable wavelength to activate the photoinitiator(s) and maintained until polymerization is complete. Suitable organic monomers for use in the organic phase are described above.

Solvent systems for the formation of organic polymer cores include methanol, ethanol, isopropanol, 2-methoxyethanol, water, acetonitrile, p-xylene, and toluene.

Stabilizers that can be employed for the formation of organic polymer cores include, for example, polyvinylpyrrolidone (PVP), non-ionic surfactants including alkylphenol ethoxylates (e.g., Triton™ N-57, available from Dow Chemical), polyvinyl alcohol (PVA) such as Selvol™ Polyvinyl Alcohol solution, available from Sekisui Special Chemicals), modified celluloses, including alkyl-modified celluloses such as methyl celluloses (e.g., Methocel™, available from DuPont) and hydrophobically modified celluloses hydroxyethylcellulose stabilizers such as Natrosol™ cetyl modified hydroxyethylcellulose (available from Ashland), and ionic surfactants including sodium alkyl sulfates such as sodium dodecyl sulfate (SDS) and sodium oleyl sulfate, among others.

A particular embodiment of nonporous organic polymer core formation, in which the monomer is a combination of DVB and styrene, the initiator is 2,2'-Azobis(2-methylpropionitrile) (AIBN), the solvent system is a combination of reagent alcohol and p-xylene, and the stabilizer is polyvinyl pyrrolidone (PVP 40), is schematically illustrated in FIG. 1. Further details can be found in the Examples below.

Once formed, the organic polymer cores may contain surface moieties from which further polymerization can proceed. For example, organic polymer cores formed from free radical polymerization commonly contain residual radical-polymerizable unsaturated surface moieties (e.g., ethylenyl moieties, vinyl moieties, methacryloxy moieties, or acryloxy moieties, etc.), from which further core growth can proceed. Such further polymerization may be used to increase the size of a given batch of organic polymer cores by adding an additional thickness of non-porous organic polymer to previously formed non-porous, organic polymer cores.

A particular embodiment of nonporous organic polymer core growth, in which the monomer is DVB, the solvent is reagent alcohol, and the stabilizer is polyvinyl pyrrolidone (PVP 40), is schematically illustrated in FIG. 2. Further details can be found in the Examples below.

Porous Organic Polymer Shells

The porous organic polymer shells have a pore volume that is greater than 0.15 cc/g of shell material. In various embodiments, the porous organic polymer shells have a pore volume that are substantially greater than 0.15 cc/g of shell material, for example, ranging from 0.15 to 1 cc/g of shell material, 0.25 to 1 cc/g of shell material, or 0.5 to 1 cc/g of shell material.

In some embodiments, the porous organic polymer shells may range, for example, from 0.1 to 2 microns in thickness, more typically, from 0.1 to 1.2 microns in thickness. In some embodiments, a ratio of the core diameter to the diameter of the entire particle may range, for example, from 0.5:1 to 0.95:1, more typically, from 0.65:1 to 0.8:1.

Like the cores, the porous organic polymer shells for use in the present disclosure comprise at least one organic polymer. The porous organic polymer shells typically contain more than 95% organic polymer, more typically more than 97.5% organic polymer, even more typically more than 99% organic polymer.

The organic polymer(s) forming the porous organic polymer shells comprise(s) residues of one or more organic monomers. The one or more organic monomers may comprise one or more hydrophobic organic monomers, one or more hydrophilic organic monomers, or a mixture thereof.

In various embodiments, the organic polymer(s) forming the porous organic polymer shells may comprise residues of only multifunctional organic monomers. In various embodiments, the organic polymer(s) forming the porous organic polymer shells may comprise residues of both multifunctional organic monomers and monofunctional organic monomers.

Hydrophobic and hydrophilic organic monomers for forming the porous organic polymer shells may be selected, for example, from those listed above for use in forming the organic polymer cores, among others. The one or more organic monomers residues forming the porous organic polymer shells may be selected from residues of hydrophobic organic monomers, residues of hydrophilic organic monomers, or mixture residues of hydrophobic organic monomers and residues of hydrophilic organic monomers.

The organic polymers forming the porous organic polymer shells can be prepared via a number of processes and mechanisms including, but not limited to, chain addition and step condensation processes, radical, anionic, cationic, ring-opening, group transfer, metathesis, and photochemical mechanisms. In certain embodiments, the porous organic polymer shells are prepared via free radical polymerization.

The porous organic polymer shells may be formed using various techniques. For example, porous organic polymer shells may be formed by first forming a removable template shell on the surface of a nonporous organic polymer core such as one of those previously described. In one particular embodiment, the removable non-crosslinked polymer shell can be formed on the organic polymer core by seeded emulsion polymerization. A particular embodiment wherein a removable non-crosslinked polystyrene shell is formed on a nonporous organic polymer core, in which the monomer styrene, the initiator is potassium persulfate, the solvent is an aqueous solvent, and the stabilizer is sodium dodecyl sulfate (SDS), is schematically illustrated in FIG. 3.

After formation of the removable template shell, the non-crosslinked polymer shell is swelled with one or more monomers and one or more porogens.

Monomers include the hydrophilic and/or hydrophobic monomers previously described, among others.

The type and amount of porogen will typically be dictated by the pore size and pore volume that is desired for the porous organic polymer shells. For example, increasing the difference in solubility parameters between the nascent polymer formed within the removable template shell and the chosen porogen may increase the pore size. Moreover, increasing the porogen concentration within the removable template shell may increase the number of interconnecting pores, while decreasing the porogen concentration within the removable template shell may decrease the number of pores.

Examples of suitable porogens that include polar and non-polar organic solvents. In addition to serving as porogens, polar organic solvents can act to retain the hydrophilic monomer in the organic phase as well. Specific examples of such organic solvents may be selected from one or more of the following: alkane and cycloalkane porogens such as hexane, heptane, isooctane, and cyclohexane; aromatic porogens such as benzene, toluene, xylene, and diethyl benzene; $C_6$-$C_{20}$ alkyl alcohols, $C_6$-$C_{20}$ cyclic alcohols, and $C_6$-$C_{20}$ aromatic alcohols, such as hexanol, 2-ethylhexanol, octanol, decanol, dodecanol, tetradecanol, hexadecanol, octadecanol, cyclohexanol, cyclooctanol, phenol, methyl phenol, benzyl alcohol, and naphthol, among others; alkyl (e.g., $C_1$-$C_8$) esters of long chain aliphatic (e.g., $C_6$-$C_{20}$) carboxylic acids, for example, methyl, ethyl, propyl, butyl, pentyl, hexyl, heptyl and octyl esters of caproic acid, caprylic acid, capric acid, lauric acid, myristic acid, palmitic acid, stearic acid or arachidic acid, alkyl (e.g., $C_1$-$C_8$) esters of aromatic acids (e.g. $C_6$-$C_{12}$ aromatic acids), for example, methyl, ethyl, propyl, butyl, pentyl, hexyl, heptyl and octyl esters of benzoic acid (e.g., ethyl benzoate, butyl benzoate and octyl benzoate, etc.), phenylacetic acid (e.g., ethyl phenylacetate, butyl phenylacetate, hexyl phenylacetate and octyl phenylacetate), naphthoic acid (e.g., ethyl naphthoate, butyl naphthoate, hexyl naphthoate, octyl naphthoate, etc.), and phthalic acid (e.g., diethyl phthalate, dibutyl phthalate, dihexyl phthalate, dioctyl phthalate, etc.), among others.

A particular embodiment in which a monofunctional monomer is selected from styrene, methacrylic acid (MA), methyl methacrylate (MMA), a multifunctional monomer is selected from DVB and ethylene glycol dimethacrylate (EDMA), an initiator is selected from Azobisisobutyronitrile (AIBN) and benzoyl peroxide (BPA), is schematically illustrated in FIG. 4.

Figure 5:
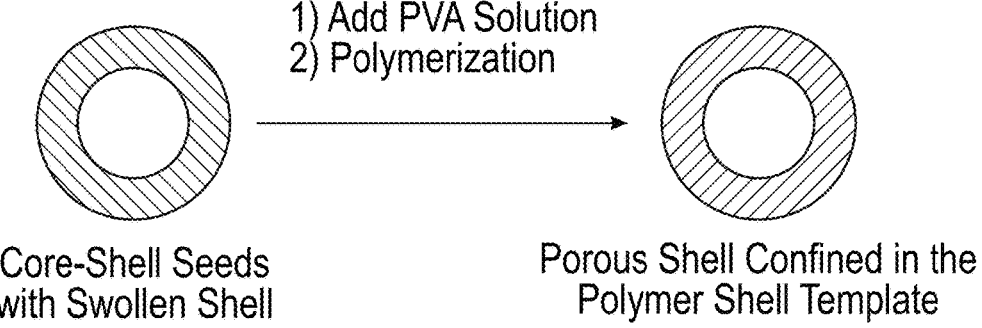
FIG. 5 is a schematic diagram illustrating the polymerization of radical polymerizable monomers within a polystyrene template, in accordance with an embodiment of the present disclosure.
Figure 6:
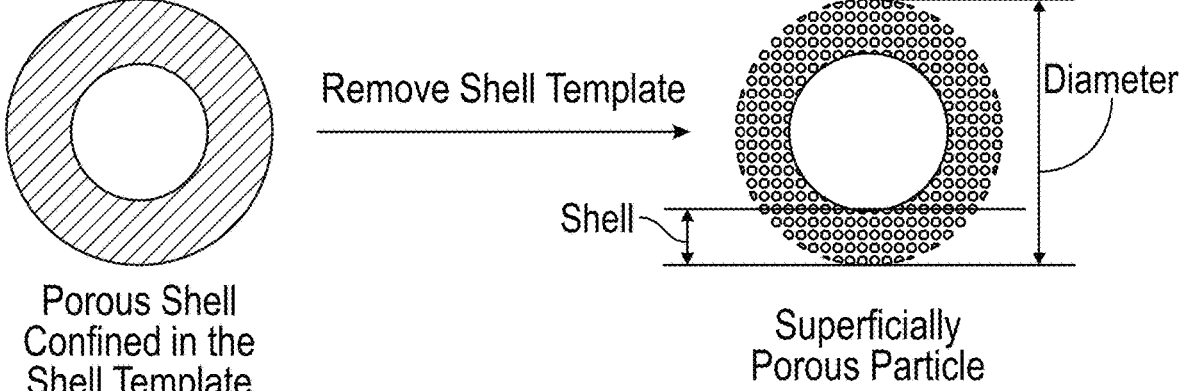
FIG. 6 is a schematic diagram illustrating polystyrene template removal to provide a porous organic polymer shell, in accordance with an embodiment of the present disclosure.

Once the non-crosslinked polymer shell of the particles is swelled with one or more monomers and one or more porogens, the particles are suspended in an aqueous phase, which may contain a stabilizer, and the one or more monomers are polymerized. A particular embodiment wherein polyvinyl alcohol (PVA) is used as a stabilizer, is schematically illustrated in FIG. 5. Polymerization forms the porous organic polymer shell. However, the shell is confined in the non-crosslinked polymer shell. To complete the process, the non-crosslinked polymer shell template is then removed by washing with an appropriate organic solvent, such as tetrahydrofuran, leaving behind the porous organic polymer shell. This step is shown schematically in FIG. 6. The particles can then be further washed to remove any residual porogens. Further details can be found in the Examples below.

It should be noted that, although a non-crosslinked polymer shell template and porous silica shell template is described above and exemplified herein, other shell templates can be employed instead. For example, in some embodiments, a porous silica shell may be formed, for example, using a layer-by-layer deposition method or a sol-gel process with the presence of the core particle. The porous silica shell may then be filled with one or more monomers and one or more porogens, after which the particles are suspended in an aqueous phase and the one or more monomers are polymerized. Then, porous silica shell template is then removed, for example, by incubating the particles in basic conditions or hydrofluoric acid (HF). The particles can then be further washed to remove any residual porogens.

Potential advantages of the organic polymer core-shell particles of the present disclosure include improvements in mass transfer and increased efficiencies relative to fully porous particles, improved pH stability, ease of surface modification, and the ability to form a broader array of pore sizes relative to present superficially porous particles. By properly design of the pore structure, the organic polymer core-shell particles can be formed having pore sizes ranging from tens to thousands of Angstrom. The organic polymer core-shell particles can be used as chromatography packing materials for the separation of both small molecules and large biologics.

Surface Modification

The porous organic polymer shells may be modified with a coating or by surface derivation. The coating and shell surface may be connected via or chemical bond or via Van der Waals forces. The coated or uncoated surface may be derivatized with desired functionality to meet a given separation requirement. Such surface modification may include but is not limited to modification with long chain (e.g., $C_4$ to $C_{20}$) alky groups, modification with polyethylene glycols, modification with hydrophilic polymers based on acrylamide and/or (meth)acrylate, and modification with polar groups containing nitride, nitrile, hydroxyl, and/or negatively or positively charged groups.

Chromatographic Devices

In some aspects of the present disclosure, the organic polymer core-shell particles described herein may be provided in a suitable chromatographic device. For this purpose, the organic polymer core-shell particles described herein may be provided in conjunction with a suitable housing. The organic polymer core-shell particles and the housing may be supplied independently, or the organic polymer core-shell particles may be pre-packaged in the housing. Housings for use in accordance with the present disclosure commonly include a chamber for accepting and holding organic polymer core-shell particles. In various embodiments, the housings may be provided with an inlet and an outlet leading to and from the chamber.

Suitable construction materials for the chromatographic housings include inorganic materials, for instance, metals such as stainless steel and ceramics such as glass, as well as synthetic polymeric materials such as polyethylene, polypropylene, polyether ether ketone (PEEK), and polytetrafluoroethylene, among others.

In certain embodiments, the chromatographic housings may include one or more filters which act to hold the organic polymer core-shell particles in a housing. Exemplary filters may be, for example, in a form of a membrane, screen, frit or spherical porous filter.

In certain embodiments, the chromatographic device is a chromatographic column.

The present disclosure also provides for a kit comprising the organic polymer core-shell particles, housings or devices as described herein and instructions for use. In one embodiment, the instructions are for use with a separation device, e.g., a chromatographic column.

Chromatographic Separations.

In some aspects of the present disclosure, the organic polymer core-shell particles of the present disclosure can be used in a variety of chromatographic separation methods. As such, the chromatographic devices and chromatographic kits described herein can also be utilized for such methods. Examples of chromatographic separation methods in which the organic polymer core-shell particles of the invention can be used include both high-pressure liquid chromatography (HPLC) and ultra-high pressure liquid chromatography (UPLC) in different modes. Those modes include, but are not limited to, affinity separations, hydrophilic interaction chromatography (HILIC) separations, normal-phase separations, reversed-phase separations, chiral separations, supercritical fluid chromatography SFC separations, perfusive separations, size-exclusion chromatography (SEC) separations, ion exchange separations, or multimode separations.

The organic polymer core-shell particles, devices and kits of the present disclosure may be used for chromatographic separations of small molecules, carbohydrates, antibodies, whole proteins, peptides, and/or DNA, among other species.

Such chromatographic separations may comprise loading a sample onto organic polymer core-shell particles in accordance with the present disclosure and eluting adsorbed species from the organic polymer core-shell particles with a mobile phase.

Such chromatographic separations may be performed in conjunction with a variety of aqueous and/or organic mobile phases (i.e., in mobile phases that contain water, an organic solvent, or a combination of water and organic solvent) and in conjunction with a variety of mobile phase gradients, including solvent species gradients, temperature gradients, pH gradients, salt concentration gradients, or gradients of other parameters.

EXAMPLES

Example 1. Non-Porous Poly(DVB 80) Particle Synthesis

In a typical particle synthesis process (example 1A in the table below), 41.9 grams of PVP-40, 7.6 grams g of Triton™ N-57 (a non-ionic surfactant), 131.4 grams of p-xylene and 2102.0 grams of reagent alcohol (~90% ethanol, ~5% methanol and ~5% isopropanol) were charged into a 4 liter kettle reactor equipped with mechanical agitation, condenser reactor and thermocouple. The mixture was mixed at 200 RPM to fully dissolve all solid contents and then was purged with nitrogen via subsurface to obtain a dissolved oxygen below 1 ppm. Once the dissolved oxygen in the solution is less than 1 ppm, 90.0 grams of divinylbenzene (DVB 80) (80%) with inhibitor removed by passing through an aluminum oxide column and 2.5 grams of 2,2'-Azobis(2-methylpropionitrile) (AIBN) were added. The agitation speed was then adjusted to and maintained at 75 RPM through the entire process. The reaction mixture was then heated to 70° C. and held at 70° C. for 20 hours.

After the reaction mixture was held at 70° C. for a total of 20 hours, the particles were separated from the reaction slurry by filtration. The particles were then washed with methanol, followed with tetrahydrofuran (THF), and lastly with acetone. The final particle was dried in vacuum oven at 45° C. overnight. 86.6 gram of 1.68 μm particles were obtained, which were narrowly distributed in particle size.

Additional examples (example 1B to example 1F) were performed in which the particles with different particle sizes are synthesized by adjusting the concentration of either PVP-40, 2,2'-azobis(2-methylpropionitrile (AIBN) or both.

| Example 1 | Initial Core Formulation, g | | | | | | Final Particle Size | | |
| | | | | | | | Coulter (<50%), μm | | Volume (<50%) |
| | Ethanol | p-Xylene | Triton N-57 | PVP-40 | DVB80 | AIBN | Volume | Number | Number (<50%) |
| --- | --- | --- | --- | --- | --- | --- | --- | --- | --- |
| A | 2102.0 | 131.4 | 7.6 | 41.9 | 90.0 | 2.50 | 1.68 | 1.65 | 1.02 |
| B | 2102.0 | 131.4 | 7.6 | 89.3 | 90.0 | 2.25 | 1.14 | 1.10 | 1.03 |
| C | 2102.0 | 131.4 | 7.6 | 89.3 | 90.0 | 1.50 | 1.14 | 1.10 | 1.03 |
| D | 2335.6 | 73.0 | 8.2 | 96.3 | 100.0 | 1.25 | 0.75 | 0.71 | 1.06 |
| E | 2308.2 | 100.4 | 8.2 | 96.3 | 100.0 | 1.25 | 0.77 | 0.73 | 1.06 |
| F | 2308.2 | 100.4 | 8.2 | 96.3 | 100.0 | 1.25 | 0.75 | 0.71 | 1.06 |

Example 2. Growth of Non-Porous Poly(DVB80) Particle in a One-Pot Reaction

In a typical particle synthesis process (example 2A), 41.9 grams of PVP-40, 7.6 grams g of Triton™ N-57, 131.4 grams of p-xylene and 2102.0 grams of reagent alcohol (90% ethanol, ~5% methanol and ~5% isopropanol) were charged into a 4 liter kettle reactor equipped with mechanical agitation, condenser reactor and thermocouple. The mixture was mixed at 200 RPM to fully dissolve all solid contents and then was purged with nitrogen via subsurface to obtain a dissolved oxygen below 1 ppm. Once the dissolved oxygen in the solution is less than 1 ppm, 90.0 grams of divinylbenzene (80%) with inhibitor removed by passing through an aluminum oxide column and 2.5 grams of 2,2'-Azobis(2-methylpropionitrile) (AIBN) were added. The agitation speed was then adjusted to and maintained at 75 RPM through the entire process. The reaction mixture was then heated to 70° C. and held at 70° C. for 40 hours. After 20 hrs hold at 70° C., 3.0 grams of AIBN was added into the reaction, then a solution containing 73.5 grams of DVB 80 free of inhibitor, 49.3 grams of PVP-40 and 493.4 grams of reagent alcohol (90% ethanol, ~5% methanol and ~5% isopropanol) was added at a constant flow rate over 2 hours. After the reaction was held at 70° C. for a total of 40 hrs, cool the reaction to below 40° C. and then the particles were separated from the reaction slurry by filtration. The particles were washed with methanol, followed with tetrahydrofuran (THF), and lastly with acetone. The final product was dried in vacuum oven at 45° C. overnight. 153 grams of 2.1 μm particles were obtained, which were narrowly distributed in particle size.

Additional examples (example 2B to example 2F) were performed in which the particles with different particle sizes are synthesized by adjusting the amounts of the various reagents as shown in the table below.

|  | Initial Core Formulation, g | | | | | | Core Growth Formulation, g | | | Final Particle Size | | |
|  | | | | | | | | | | Coulter (<50%), μm | | Volume (<50%) |
| Example 2 | Ethanol | p-Xylene | Triton N-57 | PVP-40 | DVB80 | AIBN | Ethanol | PVP-40 | DVB80 | Volume | Number | Number (<50%) |
|---|---|---|---|---|---|---|---|---|---|---|---|---|
| A | 2102.0 | 131.4 | 7.6 | 41.9 | 90.0 | 2.50 | 493.4 | 49.3 | 73.5 | 2.10 | 2.07 | 1.01 |
| B | 2102.0 | 131.4 | 7.6 | 89.3 | 90.0 | 2.25 | 58.5 | 4.6 | 23.4 | 1.25 | 1.22 | 1.02 |
| C | 2102.0 | 131.4 | 7.6 | 89.3 | 90.0 | 1.50 | 40.2 | 3.2 | 16.1 | 1.26 | 1.24 | 1.02 |
| D | 2335.6 | 73.0 | 8.2 | 96.3 | 100.0 | 1.25 | 409.0 | 32.1 | 72.3 | 0.97 | 0.94 | 1.03 |
| E | 2308.2 | 100.4 | 8.2 | 96.3 | 100.0 | 1.25 | 413.2 | 32.4 | 72.6 | 0.98 | 0.95 | 1.03 |
| F | 2308.2 | 100.4 | 8.2 | 96.3 | 100.0 | 1.25 | 413.2 | 32.4 | 72.6 | 0.97 | 0.94 | 1.03 |

Example 3. Growth of Non-Porous Poly(DVB80-Co-Styrene) Particle in a One-Pot Reaction In a typical particle synthesis process (example 3A), 77.9 grams of PVP-40, 7.7 grams g of Triton™ N-57, 222.0 grams of p-xylene and 2005.0 grams of reagent alcohol (90% ethanol, ~5% methanol and ~5% isopropanol) were charged into a 4 liter kettle reactor equipped with mechanical agitation, condenser reactor and thermocouple. The mixture was mixed at 200 RPM to fully dissolve all solid contents and then was purged with nitrogen via subsurface to obtain a dissolved oxygen below 1 ppm. Once the dissolved oxygen in the solution is less than 1 ppm, 10.0 grams of divinylbenzene (80%, inhibitor was removed with aluminum oxide), 90 grams of styrene (inhibitor was removed with aluminum oxide), 2.78 grams of 2,2'-Azobis (2-methylpropionitrile) (AIBN) were added. The agitation speed was then adjusted to and maintained at 75 RPM through the entire process. The reaction mixture was heated to 70° C. and held at 70° C. for 20 hours. After 3 hrs hold at 70° C., a solution containing 110.0 grams of DVB 80 free of inhibitor, 36.2 grams of PVP-40 and 460.0 grams of reagent alcohol (90% ethanol, ~5% methanol and ~5% isopropanol) was added at a constant flow rate over 2 hours. After the reaction was held at 70° C. for a total of 20 hrs, cool the reaction to below 40° C. and then the particles were separated from the reaction slurry by filtration. The particles were washed with methanol, followed with tetrahydrofuran (THF), and lastly with acetone. The final product was dried in vacuum oven at 45° C. overnight. 153 grams of 1.7 μm particles were obtained, which were narrowly distributed in particle size. Additional examples (examples 3B and 3C) were performed in which the particles with different particle sizes are synthesized by slightly adjusting the amount of AIBN as shown in the table below.

| Example 3 | Initial Core Formulation, g | | | | | | | Core Growth Formulation, g | | | Final Particle Size | | |
|---|---|---|---|---|---|---|---|---|---|---|---|---|---|
| | | | Triton | | | | | | | | Coulter (<50%), μm | | Volume (<50%) |
| | Ethanol | p-Xylene | N-57 | PVP-40 | DVB80 | Styrene | AIBN | Ethanol | PVP-40 | DVB80 | Volume | Number | Number (<50%) |
| A | 2005.0 | 222.0 | 7.7 | 77.9 | 10.0 | 90.0 | 2.78 | 460.0 | 36.1 | 110.0 | 1.70 | 1.69 | 1.01 |
| B | 2005.0 | 222.0 | 7.7 | 77.9 | 10.0 | 90.0 | 2.00 | 460.0 | 36.1 | 110.0 | 1.69 | 1.67 | 1.01 |
| C | 2005.0 | 222.0 | 7.7 | 77.9 | 10.0 | 90.0 | 2.00 | 460.0 | 36.1 | 110.0 | 1.70 | 1.69 | 1.01 |

Example 4. One-Pot Stepwise Growth of Core with Different Composition in Each Step In a typical particle synthesis process (example 4A), 50.1 grams of PVP-40, 6.9 grams g of Triton™ N-57, 200.0 grams of p-xylene and 1805.0 grams of reagent alcohol (90% ethanol, ~5% methanol and ~5% isopropanol) were charged into a 4 liter kettle reactor equipped with mechanical agitation, condenser and thermocouple. The mixture was mixed at 200 RPM to fully dissolve all solid contents and then was purged with nitrogen via subsurface to obtain a dissolved oxygen below 1 ppm. Once the dissolved oxygen in the solution is less than 1 ppm, 18.0 grams of divinylbenzene (80%, inhibitor was removed with aluminum oxide), 72.0 grams of styrene (inhibitor was removed with aluminum oxide), 2.5 grams of 2,2'-Azobis(2-methylpropionitrile) (AIBN) were added. The agitation speed was then adjusted to and maintained at 75 RPM through the entire process. The reaction mixture was heated to 70° C. and held at 70° C. for 40 hours. After 3 hrs hold at 70° C., a solution containing 63.7 grams of DVB80 free of inhibitor, 42.5 grams of PVP-40 and 542.0 grams of reagent alcohol (90% ethanol, ~5% methanol and ~5% isopropanol) was added at a constant flow rate over 2 hours. After the reaction was held at 70° C. for a total of 20 hours, 3.0 grams of AIBN was added into the reaction, then a solution containing 72.9 grams of DVB80 free of inhibitor, 6.5 grams of PVP-40 and 83.3 grams of reagent alcohol (90% ethanol, ~5% methanol and ~5% isopropanol) was added at a constant flow rate over 2 hours. After the reaction was held at 70° C. for a total of 40 hours, cool the reaction to below 40° C. and then the particles were separated from the reaction slurry by filtration. The particles were washed with methanol, followed with tetrahydrofuran (THF), and lastly with acetone. The final product was dried in vacuum oven at 45° C. overnight. 206 grams of 2.41 μm particles were obtained, which were narrowly distributed in particle size. Additional examples (example 4B to example 4e) were performed in which the particles with different particle sizes are synthesized by changing the amounts of the various reagents as shown in the table below.

Example 5. Non-Porous Core Growth from a Primary Core Made in Example 1 to Example 2

In a typical particle growth process (example 5 Å), 120 grams of particle (particle size, 2.44 μm) made by the method described in example 1 to example 4, were re-dispersed in a solution containing 37.0 grams of PVP-40, 4.5 grams g of Triton™ N-57, 100.0 grams of p-xylene and 1234.0 grams of reagent alcohol (90% ethanol, ~5% methanol and ~5% isopropanol), then charged into a 4 liter kettle reactor equipped with mechanical agitation, condenser reactor and thermocouple. The slurry was mixed at 200 RPM and purged with nitrogen via subsurface to obtain a dissolved oxygen below 1 ppm. Once the dissolved oxygen in the solution is less than 1 ppm, change the nitrogen subsurface sparging to blanket sparging, adjust the agitation speed to 75 RPM and then the reaction temperature was raised to 70° C. When the reaction temperature reaches 70° C., 4.8 grams of divinylbenzene (80%, inhibitor was removed with aluminum oxide) and 3.0 grams of AIBN were added. 15 minutes later, a solution containing 139.5 grams of divinylbenzene (80%, inhibitor was removed with aluminum oxide), 105.6 grams of PVP-40 and 1345.7 grams of reagent alcohol was added via a pump at a constant rate over 2 hours. After addition, the reaction was held for 20 hours at 70° C. After reaction, the particles were separated from the reaction slurry by filtration. The particles were washed with methanol, followed with tetrahydrofuran (THF), and lastly with acetone. The final product was dried in vacuum oven at 45° C. overnight. 250 grams of 3.0 μm particles were obtained, which were narrowly distributed in particle size. More examples (5B-5O) are shown in the table below.

| Example 4 | Initial Core Formulation, g | | | | | | | 1st Core Growth Formulation g | | | 2nd Core Growth Formulation, g | | | Final Particle Size | | |
|---|---|---|---|---|---|---|---|---|---|---|---|---|---|---|---|---|
| | Ethanol | p-Xylene | Triton N-57 | PVP-40 | DVB80 | Styrene | AIBN | Ethanol | PVP-40 | DVB80 | Ethanol | PVP-40 | DVB80 | Coulter (<50%), μm Volume | Number | Volume (<50%) Number (<50%) |
| A | 1805.0 | 200.0 | 6.9 | 50.1 | 18.0 | 72.0 | 2.50 | 542.0 | 42.5 | 63.7 | 83.3 | 6.5 | 72.9 | 2.41 | 2.39 | 1.01 |
| B | 1604.4 | 177.8 | 6.1 | 44.6 | 8.0 | 72.0 | 2.22 | 368.0 | 28.9 | 88.0 | 686.4 | 53.9 | 108.6 | 2.50 | 2.48 | 1.01 |
| C | 1604.4 | 177.8 | 6.1 | 44.6 | 8.0 | 72.0 | 2.22 | 368.0 | 28.9 | 88.0 | 736.8 | 57.8 | 128.6 | 2.65 | 2.63 | 1.01 |
| D | 1604.4 | 177.8 | 6.1 | 62.4 | 8.0 | 72.0 | 2.22 | 368.0 | 28.9 | 88.0 | 196.0 | 15.4 | 42.0 | 2.14 | 2.12 | 1.01 |
| E | 1604.4 | 177.8 | 6.1 | 74.0 | 8.0 | 72.0 | 2.22 | 368.0 | 28.9 | 88.0 | 217.9 | 17.1 | 46.7 | 2.13 | 2.11 | 1.01 |

| Exam-ple 5 | Primary Core Slurry | | | | | | | | Core Growth Formulation, g | | | | Final Particle Size Coulter (<50%), µm | | |
|---|---|---|---|---|---|---|---|---|---|---|---|---|---|---|---|
| | Size, µm | Charge, g | Etha-nol | p-Xy-lene | Triton N-57 | PVP-40 | DVB80 | AIBN | Etha-nol | PVP-40 | DVB80 | Sty-ene | Vol-ume | Num-ber | Volume (<50%) / Number (<50%) |
| A | 2.44 | 120.0 | 1234.0 | 100.0 | 4.5 | 37.0 | 4.8 | 3.0 | 1345.7 | 105.6 | 139.5 | 0.0 | 3.04 | 2.94 | 1.03 |
| B | 2.65 | 142.0 | 1358.0 | 150.5 | 4.9 | 34.0 | 5.4 | 3.0 | 1231.3 | 96.7 | 108.4 | 0.0 | 2.96 | 2.94 | 1.01 |
| C | 2.97 | 110.0 | 1052.0 | 116.6 | 3.8 | 26.3 | 4.2 | 2.3 | 788.0 | 61.9 | 78.8 | 0.0 | 3.29 | 3.26 | 1.01 |
| D | 3.29 | 127.0 | 1214.5 | 134.6 | 4.4 | 30.4 | 4.9 | 2.3 | 627.5 | 49.3 | 62.7 | 0.0 | 3.57 | 3.49 | 1.02 |
| E | 0.94 | 115.0 | 1099.8 | 121.9 | 4.0 | 27.5 | 4.4 | 2.2 | 867.0 | 68.1 | 86.7 | 0.0 | 1.18 | 1.15 | 1.03 |
| F | 1.14 | 115.0 | 1099.8 | 121.9 | 4.0 | 27.5 | 4.4 | 2.2 | 867.0 | 68.1 | 86.7 | 0.0 | 1.42 | 1.39 | 1.02 |
| G | 1.35 | 179.0 | 2169.6 | 189.7 | 6.2 | 42.8 | 6.8 | 3.4 | 1349.2 | 105.9 | 134.9 | 0.0 | 1.69 | 1.66 | 1.02 |
| H | 1.64 | 179.0 | 1711.8 | 189.7 | 6.2 | 42.8 | 6.8 | 3.4 | 1350.5 | 106.0 | 135.1 | 0.0 | 2.03 | 2.00 | 1.02 |
| I | 1.64 | 122.0 | 1202.8 | 133.3 | 4.4 | 60.1 | 4.8 | 2.3 | 989.7 | 64.3 | 78.0 | 14.1 | 1.96 | 1.93 | 1.01 |
| J | 0.98 | 136.0 | 1129.3 | 144.1 | 4.7 | 36.2 | 5.2 | 2.6 | 1129.3 | 73.4 | 95.7 | 17.3 | 1.20 | 1.17 | 1.02 |
| K | 1.20 | 120.0 | 1147.6 | 127.2 | 4.2 | 31.9 | 4.6 | 2.3 | 974.6 | 63.3 | 82.5 | 14.6 | 1.46 | 1.42 | 1.03 |
| L | 1.46 | 184.0 | 1759.7 | 195.0 | 6.4 | 48.9 | 7.0 | 3.5 | 1272.5 | 82.7 | 118.6 | 21.4 | 1.66 | 1.64 | 1.02 |
| M | 1.66 | 60.0 | 573.8 | 63.6 | 2.1 | 15.9 | 2.3 | 1.1 | 608.2 | 39.5 | 42.6 | 18.2 | 2.02 | 1.99 | 1.02 |
| N | 1.66 | 60.0 | 573.8 | 63.6 | 2.1 | 15.9 | 2.3 | 1.1 | 608.2 | 39.5 | 51.7 | 9.1 | 2.04 | 2.00 | 1.02 |
| O | 1.66 | 60.0 | 573.8 | 63.6 | 2.1 | 15.9 | 2.3 | 1.1 | 608.2 | 39.5 | 60.8 | 0.0 | 2.03 | 2.00 | 1.01 |

Example 6. Polystyrene Shell Template Synthesis by Seeded Emulsion Polymerization 100 grams of 2.09 µm core particle were dispersed in 1250 grams of 0.2% SDS aqueous solution and charged into a 2 L flask equipped with mechanical agitation, condenser and thermocouple. The reaction mixture was mixed and the temperature was raised to 70 T. When the temperature reaches 70 TC, 1.2 grams of potassium persulfate was added. After the addition of potassium persulfate, a mono-mer emulsion containing 44.0 grams of styrene emulsified in 500 grams of 0.2% SDS aqueous solution was added via a pump at a constant flow rate over 2 hours. After addition, the reaction was held at 70 T for 18 hours. The particles were isolated by filtration and washed with water for three time. The washed particle were redispersed in 1250 grams of 0.2% SDS solution and repeat the above process for two more times. The final particle coated with polystyrene has a diameter of 2.54 µm.

Example 7. Porous Poly(DVB-Co-Styrene) Shell Synthesis 8.1 grams of polystyrene coated core particle (2.6 µm) were dispersed in a solution consist of 0.05 grams of hydroxypropyl cellulose, 0.4 grams of Triton X-405 and 150 grams of de-ionized water by sonication. The slurry was charged into a 250 mL flask equipped with mechanical agitation, condenser and thermocouple. An emulsion was made by sonication of 1.45 grams toluene in a solution containing 12.0 mg of hydroxypropyl cellulose, 93.3 mg of Triton X-405 and 35 grams of de-ionized water. The emul-sion was added to the reaction to swell the PS for at least 3 hours at room temperature under mild agitation. The tem-perature was raised to 50° C. Another emulsion was made by sonication of 3.5 grams DVB80, 2.4 grams of styrene, 5.59 grams of toluene and 0.12 grams of benzyl peroxide in a solution containing 31.4 mg of hydroxypropyl cellulose, 251 mg of Triton X-405 and 94.1 grams of de-ionized water. The emulsion was added to reaction mixture via a pump at a constant flow rate 0.84 ml/min. After addition, 69.4 mg of potassium iodide and 44 grams of 10% PVA aqueous solu-tion were added. The reaction temperature was then raised to 85° C. and was held at for 18 hours for the polymerization. The particles were isolated by filtration and washed with water, methanol, THF and acetone for three times respec-tively. The final particle is 2.7 µm and has non-porous polymer core and a porous poly(DVB-co-styrene) shell. The average pore diameter is 174 Å measured by nitrogen BET. FIG. 7A is an electron micrograph of the whole particles. FIG. 7B is an electron micrograph of a particle cross-section.

Example 8. Porous Poly(DVB-Co-Styrene) Shell Synthesis 12.0 grams of polystyrene coated core particle (2.54 µm) were dispersed in 90 grams of 0.15% sodium dodecyl sulfate (SDS) aqueous solution by sonication. The slurry was charged into a 250 mL flask equipped with mechanical agitation, condenser and thermocouple. An emulsion was made by sonication of 2.38 grams of 1-chlorododecane in 10 grams of 0.15% SDS aqueous solution. The emulsion was added to the reaction to swell the PS for at least 8 hours at room temperature under mild agitation. After agitation for at least 8 hours, another emulsion was made by sonication of 3.4 grams DVB80, 1.4 grams of styrene and 0.1 grams of AIBN in 48.5 grams of 0.15% SDS aqueous solution. The emulsion was added to reaction mixture and mix at mild agitation for at least 8 hours at room temperature. The reaction temperature was then raised to 70° C. and was held at for 18 hours for the polymerization. The particles were isolated by filtration and washed with water, methanol, THF and acetone for three times respectively. The final particle is 2.6 µm and has a 2.1 µm non-porous polymer core and a porous poly(DVB-co-styrene) shell. The average pore diam-eter of the shell is 270 Å measured by nitrogen BET. FIG. 8A is an electron micrograph of a whole particle. FIG. 8B is an electron micrograph of a particle cross-section.

Example 9. Porous Poly(DVB80) Shell Synthesis 7.0 grams of polystyrene coated core particle (2.46 µm) were dispersed in 100 grams of 0.15% sodium dodecyl sulfate (SDS) aqueous solution by sonication. The slurry was charged into a 250 mL flask equipped with mechanical agitation, condenser and thermocouple. An emulsion was made by sonication of 2.47 grams DVB80, 0.37 grams of toluene and 0.075 grams of AIBN in 31 grams of 0.15% SDS aqueous solution. The emulsion was added to reaction mixture and mix at mild agitation for 4 hours at room temperature. The reaction temperature was then raised to 70° C. and was held at for 16 hours for the polymerization. The particles were isolated by filtration and washed with water, methanol, THF and acetone for three times respectively. The final particle is 2.7 μm and has a 2.1 μm non-porous polymer core and a porous poly(DVB80) shell. The average pore diameter of the shell is 311 Å measured by nitrogen BET. FIG. 9A is an electron micrograph of a whole particle. FIG. 9B is an electron micrograph of a particle cross-section.

Example 10. Porous Poly(DVB80-Co-Vinylbenzyl Chloride) Shell Synthesis 10.0 grams of polystyrene coated core particle (2.46 μm) were dispersed in 83.3 grams of 0.15% sodium dodecyl sulfate (SDS) aqueous solution by sonication. The slurry was charged into a 250 mL flask equipped with mechanical agitation, condenser and thermocouple. An emulsion was made by sonication of 0.7 grams DVB80, 7.4 grams of 4-vinylbenyl chloride and 0.16 grams of AIBN in 81 grams of 0.15% SDS aqueous solution. The emulsion was added to reaction mixture and mix at mild agitation for 12 hours at room temperature. The reaction temperature was then raised to 70° C. and was held at for 18 hours for the polymerization. The particles were isolated by filtration and washed with water, methanol, THF and acetone for three times respectively. The final particle is 2.6 μm and has a 2.1 μm non-porous polymer core and a porous poly(DVB80-co-vinylbenzyl chloride) shell. The pore diameter of the shell is 1500 Å. FIG. 10A is an electron micrograph of a whole particle. FIG. 10B is an electron micrograph of a particle cross-section.

Example 11. Porous Poly(EDMA-Co-GMA) Shell Synthesis 10.0 grams of polystyrene coated core particle (2.54 μm) were dispersed in 70 grams of 0.15% sodium dodecyl sulfate (SDS) aqueous solution by sonication. The slurry was charged into a 250 mL flask equipped with mechanical agitation, condenser and thermocouple. An emulsion was made by sonication of 1.76 grams of dibutyl phthalate in 13.3 grams of 0.15% SDS aqueous solution. The emulsion was added to the reaction to swell the PS for at least 6 hours at room temperature under mild agitation. After agitation for at least 6 hours, another emulsion was made by sonication of 2.6 grams ethylene glycol dimethacrylate (EDMA), 1.1 grams of glycidyl methacrylate (GMA), 1.3 grams of toluene and 0.075 grams of AIBN in 50.1 grams of 0.15% SDS aqueous solution. The emulsion was added to reaction mixture and mix at mild agitation for at least 12 hours at room temperature. Then 14.8 grams of 10% PVA aqueous solution was added and the reaction temperature was then raised to 70° C. and was held at for 18 hours for the polymerization. The particles were isolated by filtration and washed with water, methanol, THF and acetone for three times respectively. The final particle is 2.6 μm and has a 2.1 μm non-porous polymer core and a porous poly(EDMA-co-GMA) shell. The pore diameter of the shell is 1500 Å. FIG. 11A is an electron micrograph of a whole particle. FIG. 11B is an electron micrograph of a particle cross-section.

Example 12. Porous Poly(EDMA-Co-Styrene) Shell Synthesis 10.0 grams of polystyrene coated core particle (2.54 μm) were dispersed in 70 grams of 0.15% sodium dodecyl sulfate (SDS) aqueous solution by sonication. The slurry was charged into a 250 mL flask equipped with mechanical agitation, condenser and thermocouple. An emulsion was made by sonication of 1.76 grams of dibutyl phthalate in 13.3 grams of 0.15% SDS aqueous solution. The emulsion was added to the reaction to swell the PS for at least 6 hours at room temperature under mild agitation. After agitation for at least 6 hours, another emulsion was made by sonication of 2.6 grams ethylene glycol dimethacrylate (EDMA), 0.97 grams of styrene, 1.3 grams of toluene and 0.075 grams of AIBN in 50.1 grams of 0.15% SDS aqueous solution. The emulsion was added to reaction mixture and mix at mild agitation for at least 12 hours at room temperature. Then 14.8 grams of 10% PVA aqueous solution was added and the reaction temperature was then raised to 70° C. and was held at for 18 hours for the polymerization. The particles were isolated by filtration and washed with water, methanol, THF and acetone for three times respectively. The final particle is 2.6 μm and has a 2.1 μm non-porous polymer core and a porous poly(EDMA-co-styrene) shell. FIG. 12 A is an electron micrograph of a whole particle. FIG. 11B is an electron micrograph of a particle cross-section.

The invention claimed is:

1. Organic polymer core-shell particles comprising a non-porous organic polymer core and a porous organic polymer shell, wherein:
   the non-porous organic polymer core consists essentially of organic polymer; and
   the porous organic polymer shell has a pore size ranging from 100 Å to 300 Å.

2. The organic polymer core-shell particles of claim 1, wherein the organic polymer core-shell particles have a particle size ranging from 1 μm to 14 μm.

3. The organic polymer core-shell particles of claim 1, wherein the organic polymer has a polymer backbone that contains C—C covalent bonds, C—O covalent bonds, C—N covalent bonds, O—N covalent bonds, or a combination thereof.

4. The organic polymer core-shell particles of claim 1, wherein the organic polymer has a polymer backbone that contains C—C covalent bonds.

5. The organic polymer core-shell particles of claim 1, wherein the organic polymer is formed from radical polymerization or condensation polymerization.

6. The organic polymer core-shell particles of claim 1, wherein the organic polymer comprises hydrophobic organic monomer residues, hydrophilic organic monomer residues, or a mixture of hydrophilic organic monomer residues and hydrophobic organic monomer residues.

7. The organic polymer core-shell particles of claim 1, wherein the organic polymer core comprises a central core region and an outer core region surrounding the central core region, and wherein a concentration of monofunctional monomer residues is greater in the central core region than in the outer core region.

8. The organic polymer core-shell particles of claim 1, wherein the organic polymer comprises divinyl benzene residues, styrene residues, (meth)acrylate residues, and combinations thereof.

9. The organic polymer core-shell particles of claim 1, wherein the porous organic polymer shell ranges from 0.1 to 4 microns in thickness.

10. The organic polymer core-shell particles of claim 1, wherein a ratio of a diameter of the non-porous core to an overall diameter of the organic polymer core-shell particle is in the range from 0.4/1 to 0.99/1.

11. The organic polymer core-shell particles of claim 1, wherein the organic polymer shell comprises an organic polymer having a polymer backbone that contains C—C covalent bonds, C—O covalent bonds, C—N covalent bonds, O—N covalent bonds, or a combination thereof.

12. The organic polymer core-shell particles of claim 1, wherein the organic polymer shell comprises a polymer backbone that contains C—C covalent bonds.

13. The organic polymer core-shell particles of claim 1, wherein the organic polymer shell is formed from radical polymerization or condensation polymerization.

14. The organic polymer core-shell particles of claim 1, wherein the organic polymer shell comprises hydrophobic organic monomer residues, hydrophilic organic monomer residues, or a mixture of hydrophilic organic monomer residues and hydrophobic organic monomer residues.

15. The organic polymer core-shell particles of claim 1, wherein the organic polymer shell comprises polyfunctional monomer residues.

16. The organic polymer core-shell particles of claim 15, wherein the polyfunctional monomer residues are selected from divinylbenzene residues, ethylene glycol dimethacrylate residues, di(meth)acrylate residues, and combinations thereof.

17. The organic polymer core-shell particles of claim 15, wherein the organic polymer shell further comprises monofunctional monomer residues.

18. The organic polymer core-shell particles of claim 17, wherein the monofunctional monomer residues are selected from styrene residues, vinylbenzyl chloride residues, glycidyl methacrylate residues, (meth)acrylamide residues, and combinations thereof.

19. The organic polymer core-shell particles of claim 1, wherein the organic polymer core does not comprise an inorganic structure; and the organic polymer shell does not comprise an inorganic structure.

* * * * *